US010312834B2

United States Patent
Van Kessel

(10) Patent No.: US 10,312,834 B2
(45) Date of Patent: Jun. 4, 2019

(54) MULTI-PHASE EAP SYSTEM AND METHOD FOR CONTROLLING SUCH A SYSTEM

(71) Applicant: SINGLE BUOY MOORINGS INC., Marly (CH)

(72) Inventor: Rick Van Kessel, Nice (FR)

(73) Assignee: SINGLE BUOY MOORINGS INC., Marly (CH)

( * ) Notice: Subject to any disclaimer, the term of this patent is extended or adjusted under 35 U.S.C. 154(b) by 465 days.

(21) Appl. No.: 15/036,155

(22) PCT Filed: Nov. 13, 2014

(86) PCT No.: PCT/EP2014/074453
§ 371 (c)(1),
(2) Date: May 12, 2016

(87) PCT Pub. No.: WO2015/071345
PCT Pub. Date: May 21, 2015

(65) Prior Publication Data
US 2016/0301330 A1    Oct. 13, 2016

(30) Foreign Application Priority Data
Nov. 13, 2013 (EP) ..................................... 13192706

(51) Int. Cl.
*H01L 41/113* (2006.01)
*H01L 41/18* (2006.01)
*H02N 2/18* (2006.01)

(52) U.S. Cl.
CPC .............. *H02N 2/181* (2013.01); *Y02E 10/38* (2013.01)

(58) Field of Classification Search
CPC ............................. H02N 2/181; H01L 41/107
(Continued)

(56) References Cited

U.S. PATENT DOCUMENTS 6,198,199 B1 * 3/2001 Hoffmann ........... F02D 41/2096
310/316.03
7,557,456 B2 * 7/2009 Kornbluh ............ F03B 13/1845
290/42
(Continued)

FOREIGN PATENT DOCUMENTS

CA    2766974 A1 * 1/2006 .............. F03B 13/14
WO    2010/011562 A1    1/2010
(Continued)

OTHER PUBLICATIONS

International Search Report, dated Jan. 26, 2015, from corresponding PCT Application.

*Primary Examiner* — Thomas M Dougherty
(74) *Attorney, Agent, or Firm* — Young & Thompson

(57) ABSTRACT

Method including a plurality of EAP based sections, a power source/sink unit and a controller. Each EAP based section includes an electronic charge/discharge unit and variable capacitor having an elastically deformable body with an arrangement of stretchable synthetic material and electrodes functioning as the capacitor with a variable capacitance as the deformable body stretches and relaxes. Each EAP based section is connected to the power source/sink unit by the respective electronic charge/discharge unit under control of the controller which includes: a processing unit coupled to a sensing circuitry which is coupled to the variable capacitor of each EAP based section, and a driving circuitry coupled to the electronic charge/discharge unit. The method includes for each EAP based section: receiving a state parameter signal/signals from the capacitor; establishing a dedicated control signal based on the associated state parameter signal/signals received; transmitting the dedicated control signal to the associated electronic charge/discharge unit.

14 Claims, 10 Drawing Sheets

(58) Field of Classification Search
USPC ...... 310/307, 316.01–316.03, 318, 339, 800; 290/42–44, 53–55
See application file for complete search history.

(56) References Cited

U.S. PATENT DOCUMENTS

| | | | | |
|---|---|---|---|---|
| 2002/0113563 A1* | 8/2002 | Jansson | ................. | H02N 2/065 |
| | | | | 318/116 |
| 2010/0019498 A1 | 1/2010 | Pollack et al. | | |
| 2010/0314871 A1* | 12/2010 | Jean | ..................... | F03B 13/185 |
| | | | | 290/42 |
| 2015/0137661 A1* | 5/2015 | Otsuka | ................. | B41J 2/04588 |
| | | | | 310/316.03 |

FOREIGN PATENT DOCUMENTS

| | | | |
|---|---|---|---|
| WO | 2010/146457 | A2 | 12/2010 |
| WO | 2011/044901 | A1 | 4/2011 |
| WO | 2012/122440 | A2 | 9/2012 |
| WO | 2013/059562 | A1 | 4/2013 |
| WO | 2013/167667 | A2 | 11/2013 |

* cited by examiner

MULTI-PHASE EAP SYSTEM AND METHOD FOR CONTROLLING SUCH A SYSTEM

FIELD OF TECHNOLOGY

The present invention relates to a multi-phase EAP system. Also, the invention relates to a method for controlling such an EAP system.

BACKGROUND

At present, EAP (Electro Active Polymers) based actuators and generators (i.e. EAP based energy converters) are operated by either passive harvesting systems, where the deformation itself of an EAP based deformable body which acts as a variable capacitor, forces a flow of energy, or by active systems that control the electrical field, voltage or charge directly. As the latter approach typically yields higher conversion efficiencies and higher energy densities, it is preferred for especially larger systems or efficiency sensitive (battery-powered) applications.

An active system is for example disclosed in WO 2010/146457.

The way the electric field is established and controlled during the excitation determines the amount of energy that is converted. This is described by energy harvesting cycles; at present mainly three distinctive cycles are used in systems that charge and discharge the EAP actively; constant-charge, constant-voltage and constant-field cycles (SRI International). The focus of these cycles is on the way the power electronic unit (PEU) interacts with the EAP device during stretching or contraction (or relaxation). In these periods, most of the electromechanical conversion takes place.

Although Electro Active Materials are well known for their capability of handling large mechanical deformation (up to 500%), in many practical applications the deformation is limited; not only due to the nature of the application (such as excitation by waves) but also to limit the effect of fatigue.

Since the electromechanical transduction is based on interaction with an electric field, in applications with small deformation levels, the amount of energy required to cyclically bias the EAP device with an operating electric field is much larger than the amount of energy that is actually available for conversion. This increases the required power rating of the Power Electronic Unit, challenges the electromechanical conversion efficiency and adds cost and volume to an EAP based energy conversion system.

In electromechanical conversion applications with distributed sources, such as wave energy converters (as disclosed in WO2010011562) or rotational-to-reciprocating energy converters (as disclosed in WO2013059562), where an essential phase-shift exists between the different EAP devices within the application the required bias energy can be exchanged internally between the different EAP devices. In such multi-phase systems, the inherent ability of EAP devices to store energy is used effectively, offering distinctive advantages with respect to power capacity requirements, converter efficiency constraints and power quality.

Single-phase EAP based energy conversion systems such as described in PCT/EP2013/059614 have a dedicated Power Electronic Unit (PEU) or converter for each EAP device. This provides full controllability on the harvesting cycle applied to each EAP device, but since the bias energy needs to be applied cyclically by the PEU, it suffers from high-to-average power ratings, which in turn results in high converter cost, low electromechanical conversion efficiency with a very strong sensitivity to the PEU efficiency and as a result thereof, a need for technologically advanced converter implementations.

To limit the effect of the high peak to average power rating, some of the existing single-phase systems already employ some kind of harvesting strategy that attempts to optimize the energy conversion cycle such as published by Graf and Maas, "*Optimized Energy Harvesting based on Electro Active Polymers*", 2010 International Conference on Solid Dielectrics, Potsdam, Germany, Jul. 4-9, 2010, by Graf, Maas and Schapeler, "*Optimized Energy Harvesting based on Electro Active Polymers*", 2010 International Conference on Solid Dielectrics, Potsdam, Germany, Jul. 4-9, 2010, and by R. van Kessel, B. Czech, P. Bauer, and J. Ferreira, "*Optimizing the dielectric elastomer energy harvesting cycles,*" IECON 2010, 36th Annual Conference on IEEE Industrial Electronics Society 2010, pp. 1281-1286 (http://dx.doi.org/10.1109/IECON.2010.5675554)

However, these strategies focus on the EAP-to-PEU conversion stage only and not the overall system output power quality, and do not fully overcome the inherent deficiencies of single-phase energy conversion and the associated high peak to average power rating.

On the other hand, the multi-phase EAP energy conversion systems to date, such as described in WO 2010/146457 and WO 2011/044901, mostly use passive components in order to lower the amount of power that needs active processing. Whereas these systems are normally fairly effective in lowering the required active PEU power rating and also in providing some kind of system output power smoothening, individual control of the EAP sections in the system is barely possible due to the limited number of control inputs. Individual control of EAP sections is a prerequisite for operating at high electric field strengths and hence, high energy output, especially when irregular excitation sources are considered.

It is therefore an object of the invention to provide a system and method that overcome or mitigate the disadvantages of the prior art.

SUMMARY OF THE INVENTION

The object is achieved by an Energy Harvesting System using a plurality of EAP based sections, comprising a plurality of EAP based sections, a power source/sink unit and a controller; each EAP based section comprising an electronic charge/discharge unit and variable capacitor; the variable capacitor comprising an elastically deformable body with an arrangement of stretchable synthetic material and electrodes being arranged as the variable capacitor with a capacitance that varies as the deformable body stretches and relaxes; each EAP based device being connected to the power source/sink unit by the respective electronic charge/discharge unit under control of the controller; the controller comprising a processing unit, sensing circuitry and driving circuitry, with the processing unit being coupled to the sensing circuitry and the driver circuitry; the sensing circuitry being coupled to the variable capacitor of each EAP based device for receiving at least one state parameter signal from the variable capacitor; the driving circuitry being coupled to the electronic charge/discharge unit for transmitting a dedicated control signal to the electronic charge/discharge unit;

the processing unit being arranged to establish for each EAP based device a control value of the dedicated control signal based on the associated state parameter signal received from the variable capacitor.

Moreover, the invention provides a Method for an Energy Harvesting System using a plurality of EAP based devices, comprising the plurality of EAP based devices, a power source/sink unit and a controller;
each EAP based device comprising an electronic charge/discharge unit and variable capacitor; the variable capacitor comprising an elastically deformable body with an arrangement of stretchable synthetic material and electrodes being arranged as the variable capacitor with a capacitance that varies as the deformable body stretches and relaxes;
each EAP based device being connected to the power source/sink unit by the respective electronic charge/discharge unit under control of the controller;
the controller comprising a processing unit, sensing circuitry and driving circuitry, with the processing unit being coupled to the sensing circuitry and the driver circuitry;
the sensing circuitry being coupled to the variable capacitor of each EAP based device;
the driving circuitry being coupled to the electronic charge/discharge unit
the method comprising:
for each EAP based device:
receiving an state parameter signal/signals from the variable capacitor
establishing a dedicated control signal based on the associated state parameter signal/signals received from the variable capacitor;
transmitting the dedicated control signal to the associated electronic charge/discharge unit.

Advantageous embodiments are further defined by the dependent claims.

BRIEF DESCRIPTION OF DRAWINGS

The following detailed description of embodiments of the present invention will be better understood when read in conjunction with the appended drawings. In the drawings, entities with the same reference number refer to corresponding entities. Such entities are either substantially identical or equivalent to the corresponding entities in the preceding figures and will not described here in detail.

DESCRIPTION OF EMBODIMENTS

The invention will be explained in more detail below with reference to drawings in which illustrative embodiments of the invention are shown.

Figure 1:
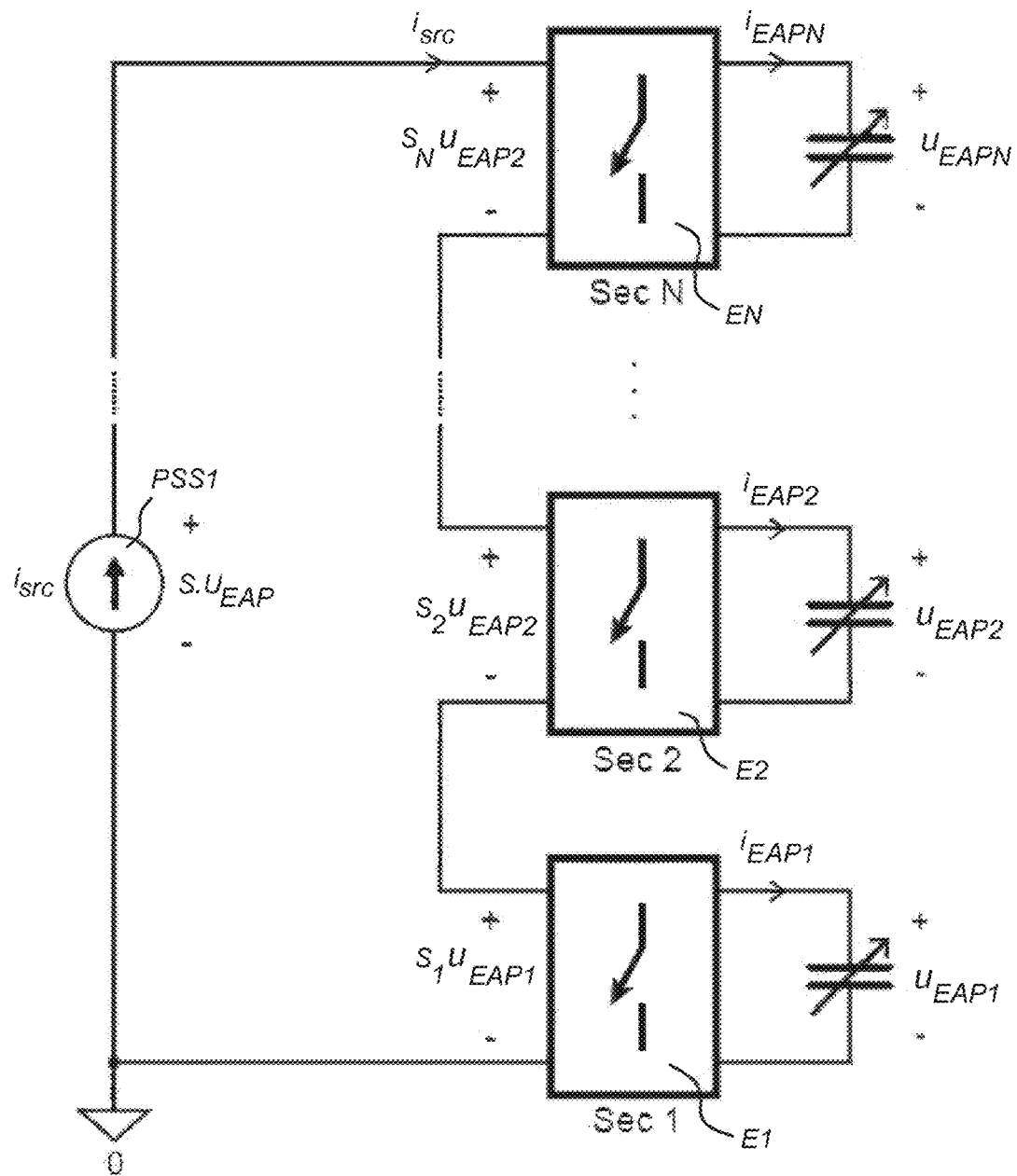
FIG. 1 schematically shows a multiphase topology of EAP devices according to an embodiment.

FIG. 1 schematically shows a multiphase topology of EAP devices according to an embodiment.

According to this embodiment of the invention, to accommodate the exchange of (bias) energy between EAP devices in a multi-phase system, the proposed topology is based on a configuration in which all EAP devices are connected in series to a common power source (actuation mode) or power sink (generation mode) PSS.

The multiphase system is based on a plurality of EAP devices that are each subjected to moving media, typically, waves on a water surface such as the sea, or any other EAP energy conversion system in which a mechanical source is captured by multiple EAP devices that are spatially or temporally distributed.

Due to the variation in location between the individual EAP devices, the phase of the wave cycle will vary as well resulting in a variation of the phase of the elastic deformation cycle and of the corresponding energy harvesting cycle between the EAP devices. The EAP devices will thus display a phase shift in their energy harvesting cycle, relative to each other.

The individual EAP devices EAP1, EAP2, . . . , EAPN are each connected through an electronic charge/discharge unit E1, E2, . . . , En (also referred to as Power Director Device (PDD)), that directs incident power flow such that, depending on a dedicated control signal for an associated EAP device, that EAP device can be charged (s=1, $\Delta Q>0$), bypassed (s=0, $\Delta Q=0$), or discharged (s=−1, $\Delta Q<0$); $\Delta Q$ being the change of charge on the variable capacitor of the individual EAP device.

The actual voltage on each EAP device is denoted as $U_{EAP1}$, $U_{EAP2}$, . . . , $U_{EAPN}$.

The combination of a PDD E1, E2, . . . , En with an EAP device EAP1, EAP2, . . . , EAPN is referred to as section SEC1, SEC2, . . . , SECN, which forms the elementary cell in this topology.

In the series configuration, the same current $I_{SRC}$ flows through each section SEC1, SEC2, . . . , SECN, whereas the voltages $U_{EAP1}$, $U_{EAP2}$, . . . , $U_{EAPN}$ add up along the stack. Hence, for the current applied to the sections and power source PSS:

$$i_{src} = i_{sec1} = i_{sec2} = \ldots = i_{secN}$$

And for the voltages in the stack, and more specifically, the voltage across the power source PSS, which is a linear combination of all individual EAP device voltages depending on the control signal:

$$u_{src} = \sum_{i=1}^{N} u_{sec,i} = \sum_{i=1}^{N} s_i u_{EAP,i} = s \cdot u_{EAP}$$

With N being the number of sections in the stack, $u_{sec,i}$ being the voltage of the i-th section, $s_i$ the control signal of the i-th section, s the switching vector of control signals, with $s_i \in \{-1,0,1\}$, and $u_{EAP}$ the vector with EAP device voltages.

In this embodiment, the order in which the phase-shifted EAP devices EAP1, EAP2, . . . , EAPN are included in the stack does not affect the operation of the system as such, though it is identified that some particular sequences could result in lower component voltage ratings and other benefits.

Figure 2:
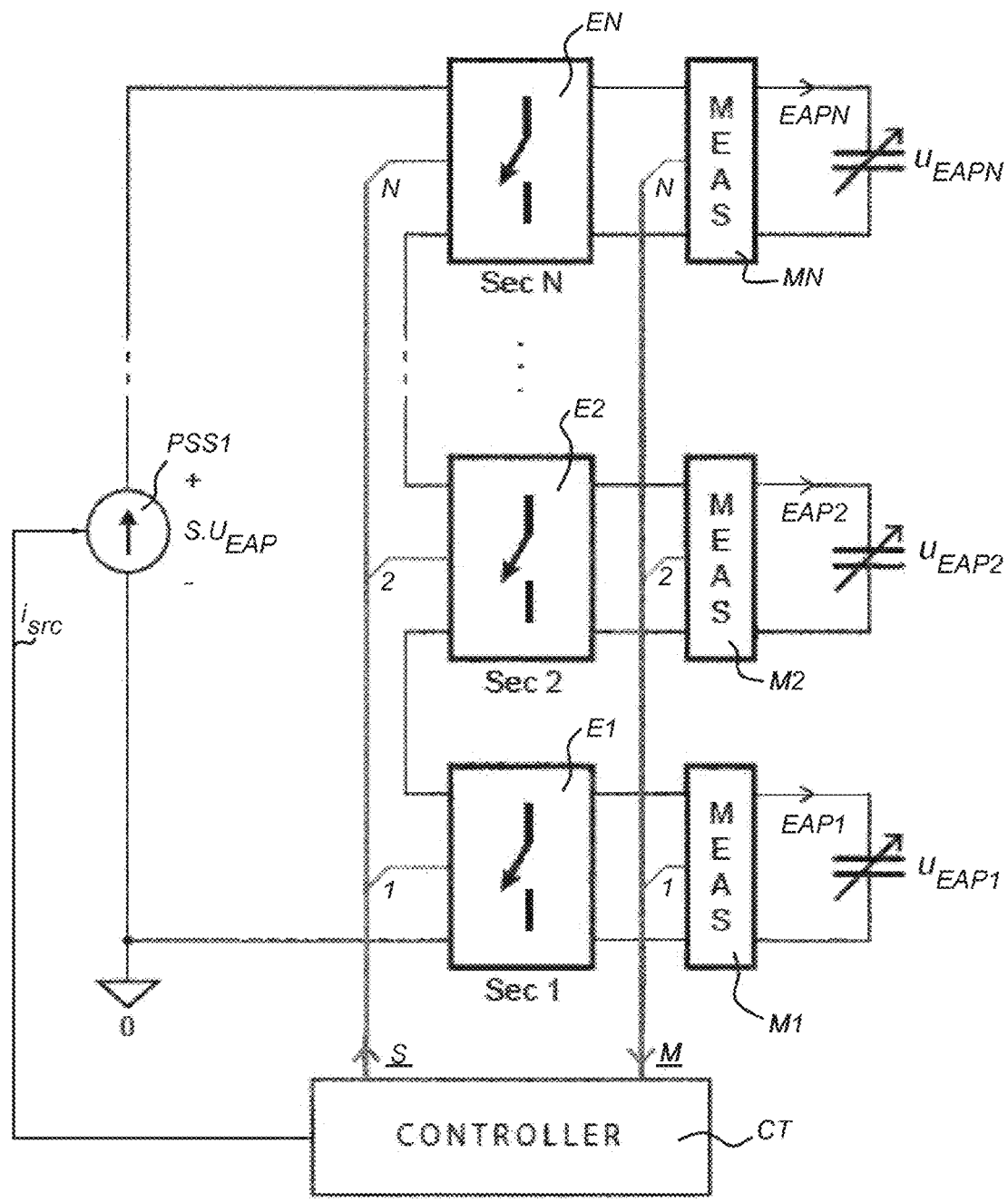
FIG. 2 schematically shows an embodiment of the multiphase topology of FIG. 1.

FIG. 2 schematically shows an embodiment of the multiphase topology of FIG. 1. In this circuit, the Common Power Source (CPS) PSS1 is implemented by a common current source, but it is not excluded that other types of electrical power sources might be employed for this purpose.

In this embodiment, the system further comprises a controller CT, and for each EAP device a monitoring unit M1, M2, . . . , MN.

Each monitoring unit M1; M2; . . . ; MN is coupled between the electronic charge/discharge unit E1; E2; . . . ; EN and the associated EAP device EAP1; EAP2; . . . EAPN. In each section SEC1-SECN, the monitoring unit is configured to monitor state parameters of the EAP device that indicates the present capacitance of the variable capacitor and thus the present phase of the EAP device in the energy harvesting cycle.

The Monitoring Unit monitors a voltage of the EAP Device (to be used in a switching algorithm as described below in more detail), and a capacitance to determine the actual strain and phase.

For example, the capacitance can be measured directly by injecting a known, sinusoidal current at a frequency that is substantially higher than the mechanical excitation frequency, and then measuring the resulting voltage at this frequency. Another possibility is to measure the current that flows through the EAP device in a predefined time window, determine the corresponding change in charge (dQ) and using measurement of a change of the voltage (dU) to determine the capacitance.

The controller CT comprises sensing circuitry which is coupled to each monitoring unit M1, M2, . . . , MN for receiving the state parameter signal/signals from each monitoring unit.

Additionally, the controller CT comprises driving circuitry that is coupled to each electronic charge/discharge unit E1, E2, . . . , EN to transmit a dedicated control signal to the respective electronic charge/discharge unit.

The controller further comprises at least a processing unit for processing data to carry out an energy harvesting cycle (as will be described in more detail below) with control of the sensing circuitry and driving circuitry.

The electronic charge/discharge unit is arranged with circuitry to receive the dedicated control signal from the controller CT and to select, based on the value of the control signal, either a charging mode (s=1, ΔQ>0), or a discharging mode (s=−1, ΔQ<0) or a bypass mode or floating mode (s=0, ΔQ=0) for the variable capacitor of the EAP device.

Figure 3:
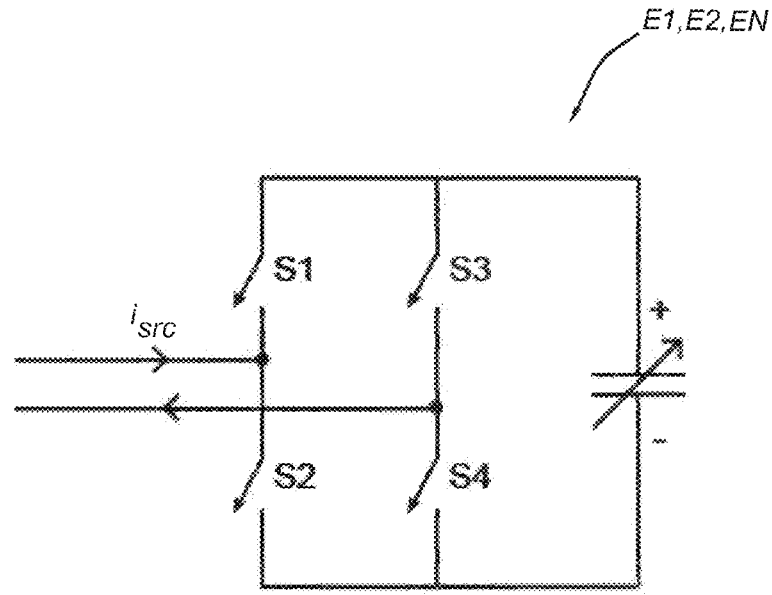
FIG. 3 schematically shows a power directing circuitry in accordance with the embodiment shown in FIG. 2.

In the embodiment, the Common Power Source PSS1 is the only component that actively processes an electrical power flow, whereas the electronic charge/discharge units or Power Director Devices E1, E2, . . . , EN are only routing the power flow through the EAP device according to the employed switching algorithm and EAP harvesting strategy. FIG. 3 shows a possible implementation of such an electronic charge/discharge unit or Power Director Device.

Incident power identified here by current $I_{SRC}$ is bypassed by controllably enabling switches (S1+S3) or (S2+S4), while for positive $I_{SRC}$ the incident power is charging the EAP device by (S1+S4) and discharging by enabling switches (S2+S3) and vice versa for negative $I_{SRC}$.

The switches might be realized by (a stack of) MOSFETs, Insulated Gate Bipolar Transistors (IGBTs), or any other forced or non-forced commutated power electronic or mechanical switch device.

It is identified that in the bypass-mode (s=0), switch combinations (S1+S3) and (S2+S4) can be used alternately in order to equalize the losses in these components.

Alternatively, the non-active electronic charge/discharge units or PDD's might be replaced by electronic devices that actively process and redirect power flow, based on the received dedicated control signal.

Figure 4:
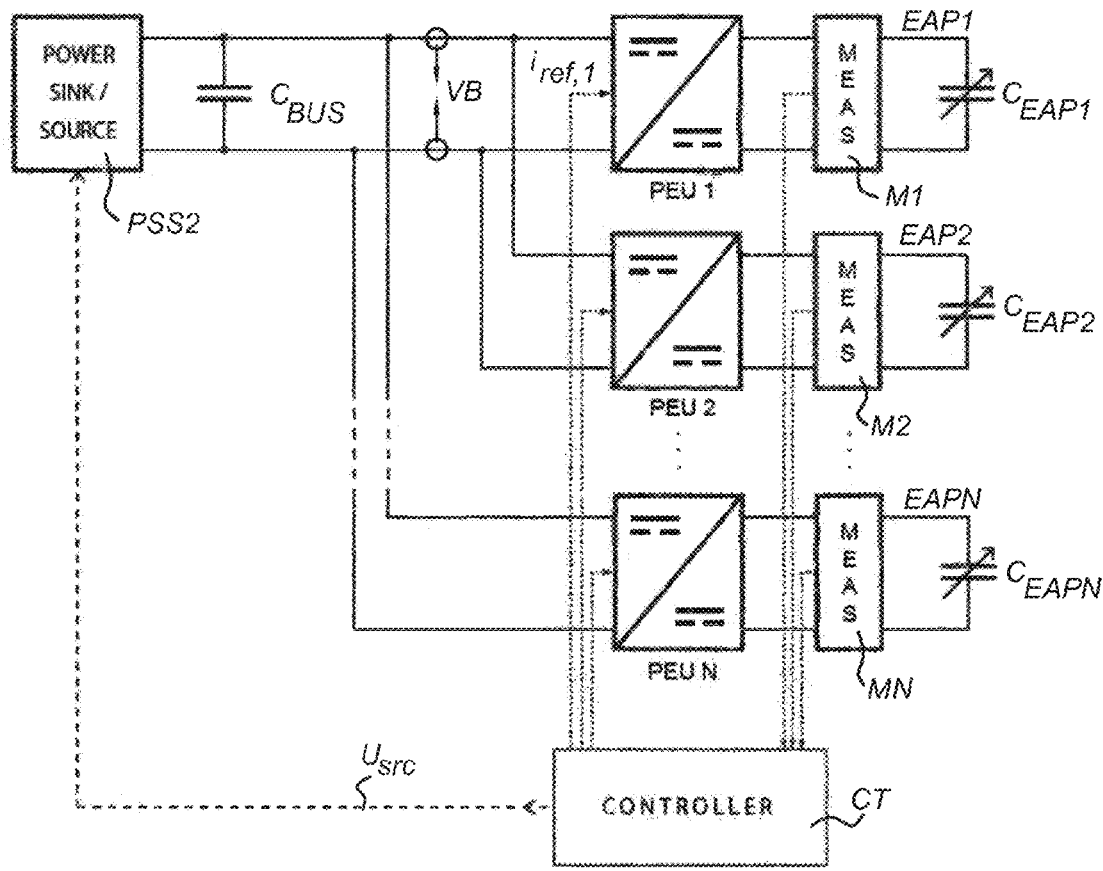
FIG. 4 schematically shows an alternative embodiment of the multiphase topology of FIG. 1.

FIG. 4 shows an alternative embodiment of the present invention with actively processing electronic charge/discharge units.

In this embodiment, the EAP devices EAP1, EAP2, . . . , EAPN each have a dedicated Power Electronic Unit (converter) PEU1, PEU2, . . . , PEUN that connect to a voltage bus VB or Common Voltage Source acting as Common Power Source/Sink unit PSS2.

Thus, the plurality of EAP based devices are in a parallel connection to the power source/sink unit PSS2.

Further the energy harvesting system comprises monitoring units M1, M2, . . . , MN and a controller CT, both as described above with reference to FIG. 2.

Figure 5:
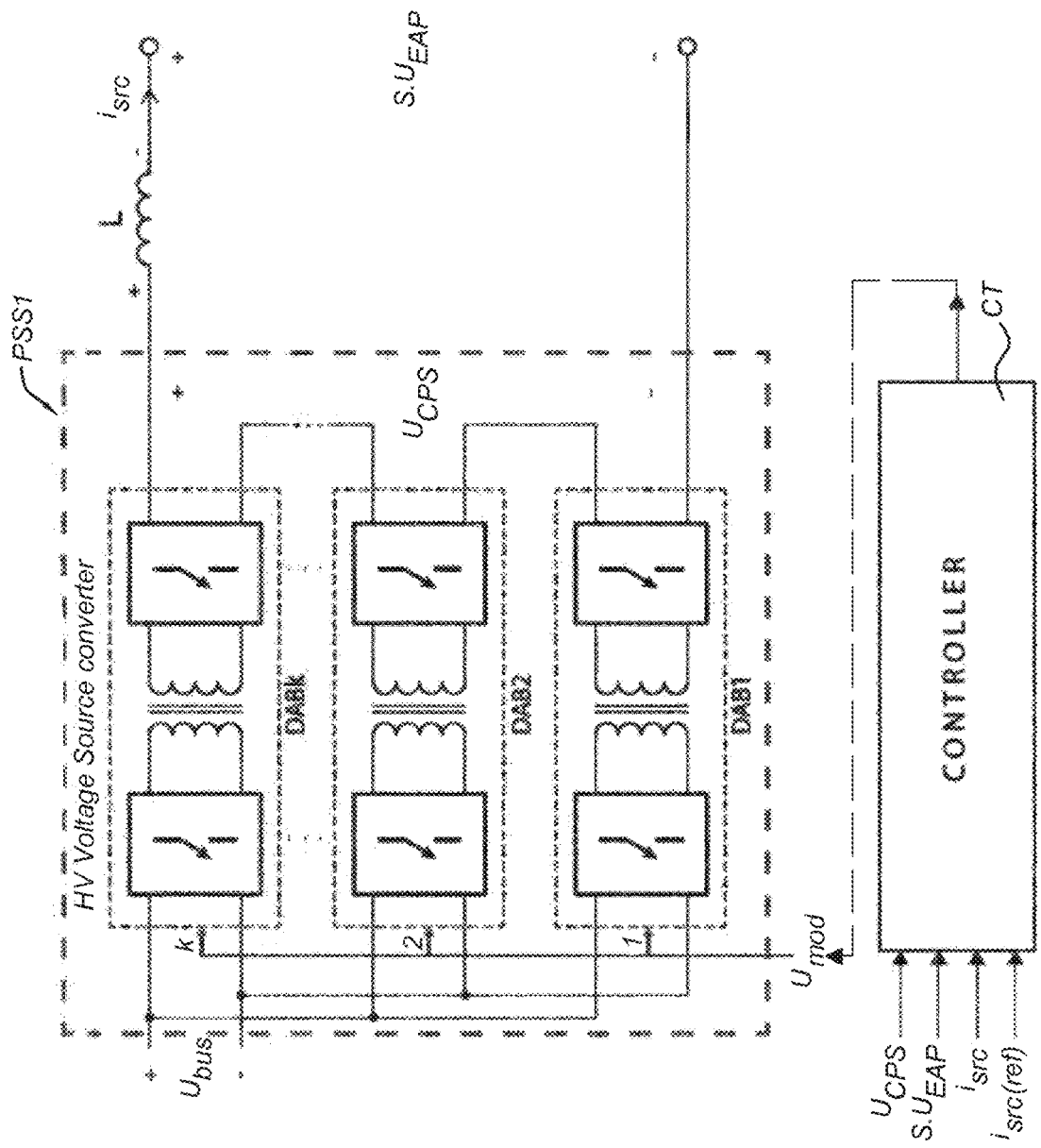
FIG. 5 schematically shows an embodiment of a current source for the multiphase topology.

FIG. 5 shows an embodiment of the Common Current Source PSS1 as applied in the embodiments of FIG. 1 and FIG. 2, which uses an inductor and voltage source converter to generate a (constant) current for the series connected multi-phase sections. A possible embodiment of the HV Voltage Source converter is the Input Parallel, Output Series (IPOS) configuration, in which a source voltage from the voltage bus $U_{BUS}$ is coupled in parallel to the individual input terminals of a number of Dual Active Bridge (DAB) devices DAB1, DAB2, . . . , DABk each comprising a transformer unit and switching circuitry, and the output terminals of the DAB devices are coupled in series to produce an output voltage $U_{CPS}$ and carrying the current for the series connected multi-phase sections.

Note that the controller CT is configured to control the actual number of active DAB devices by a secondary control signal to create the source voltage $U_{CPS}$ equal to vector dot product $S \cdot U_{EAP}$ in order to keep the source current $I_{SRC}$ at the desired reference value $I_{SRC(ref)}$.

It is noted that the number K of transformers or DAB modules is not directly linked to the number N of EAP devices. More EAP sections means in general a higher voltage for the CPS, but the number of sub-modules is dictated by the voltage rating of each module.

The embodiment of the power source/sink unit as shown in FIG. 5 can also be used as power source/sink unit (Power Electronic Unit) in the multi-phase EAP system as embodied in FIG. 4 with the application of active, parallel connected charge/discharge units. To span the wide voltage and current range that is dictated by the harvesting strategy, the embodiment includes a variable, output voltage-dependent switching frequency control strategy for the Dual Active Bridge (DAB) sub-modules as shown in FIGS. 6a and 6b.

As described above with reference to FIG. 5, the sub-modules SM1, SM2, . . . , SMN are each coupled to an output of the controller CT for receiving a control signal to cause the submodule to generate an output voltage at its output terminals in correspondence with the control signal.

Although the control of the submodules could be controlled by the same controller CT of the series-connected multi-phase system, in practice these controllers will be separated. So a second controller CT2, that is included for each IPOS/CMC topology based PEU, controls the individual submodules such that the overall PEU output voltage and current follow the reference control signals from the main (harvesting) controller CT, under the constraint that the output voltage and output current of any submodule does not exceed a critical value.

Figure 6A:
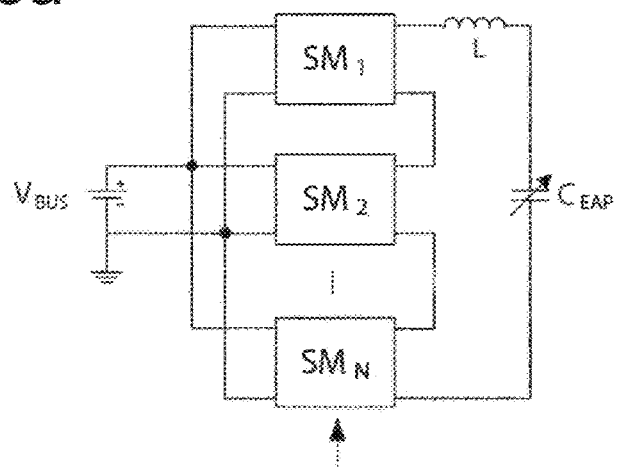
FIGS. 6a, 6b schematically show embodiments of circuitry for a power electronic unit for use in a multiphase topology system.
Figure 6B:
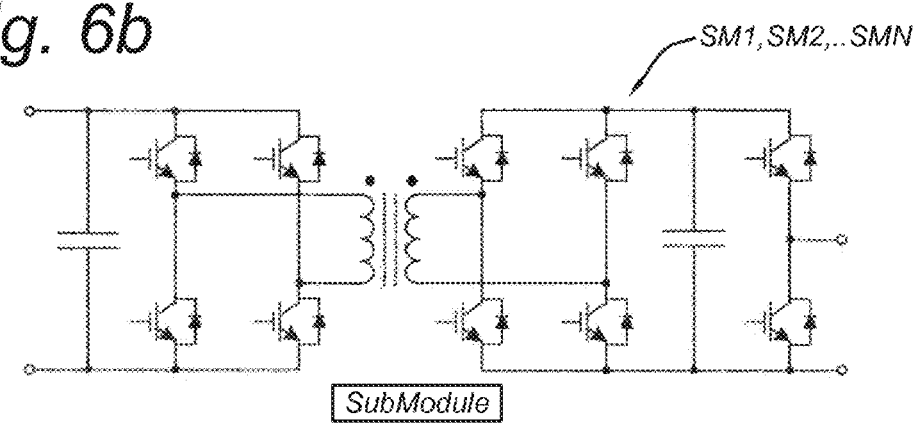

FIG. 6a shows another possible embodiment for the HV Voltage Source converter of the Common Current Source of FIG. 5. The arrangement shown in FIG. 6a is similar to that of FIG. 5 regarding the aspect that Dual Active Bridge (DAB) submodules SM1, SM2, . . . , SMN at their input terminals are coupled to the voltage bus VB in parallel, while the output terminals of the submodules are coupled in series. FIG. 6b shows a more detailed layout of the circuitry of a single submodule, which is equipped with an additional half-bridge at the output for increased controllability of the output voltage.

It is noted that such DAB submodules in an IPOS or CMC configuration may be used in case of both a multiphase EAP system and a single phase EAP system.

This Cascaded Multilevel Converter (CMC) is also a possible embodiment of the Power Electronic Units in the embodiment of the multi-phase EAP system shown in FIG. 4.

Figure 7:
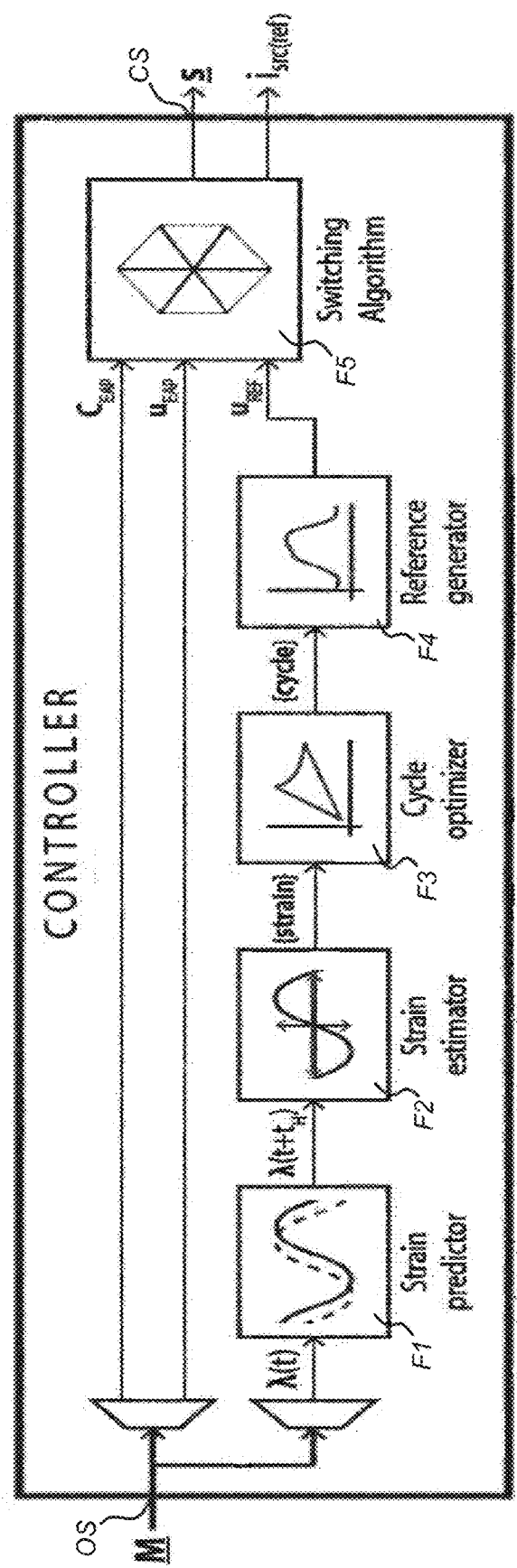
FIG. 7 schematically shows a block diagram of a controller of the multiphase topology.

FIG. 7 schematically shows a block diagram of a controller of the multiphase topology.

The controller CT comprises an input OS for receiving state parameter signals as measured by the monitoring unit for each of the EAP devices (through the respective monitoring unit M1, M2, . . . , MN) and an output CS for transmitting control signals S to each of the electronic charge/discharge units E1, E2, . . . , EN.

The controller CT comprises sensing circuitry for receiving the state parameter signals and driving circuitry for transmitting the control signals. Further the controller CT comprises a processing unit coupled to both the sensing circuitry and the driving circuitry. The processing unit is configured to determine the control signals based on the received state parameter signals. Schematically, the processing unit is capable of subsequently performing on the state parameter signal(s) the functions of strain prediction F1, strain estimation F2, cycle optimization F3 and the generation of a reference signal F4.

From blocks F1-F4, a reference voltage signal Uref is obtained.

Additionally the processing unit is capable of performing the function of a switching algorithm F5 that determines the control signal(vector) S for each individual EAP device in such a manner that the overall energy harvesting system is optimized.

The switching algorithm block F5 takes as input Uref, and state parameters $C_{EAP}$, and $U_{EAP}$. As output the switching algorithm F5 generates the control vector S.

With the topology depicted in FIG. 2, each EAP device in the series connection can be charged, discharged and bypassed following the corresponding signal in the control vector S. As such, virtually any charge, voltage or electric field profile can be independently created on the phase-shifted EAP devices. The switching algorithm defines the control vector S periodically in time by sampling the state parameter signals from the individual EAP devices, with an update rate that is reflected by the switching frequency $f_s$ of the control signals S, with the switching frequency/cycle period being (much) shorter than the energy harvesting cycle for an individual EAP device.

The number of possible control vectors S increases exponentially with the number of sections SEC1, SEC2, . . . , SECN in the multi-phase EAP system. Hence, more control freedom is obtained with more EAP devices in the series connection:

$$|S|=3^N$$

where S is the set of all possible switching vectors, | . . . | denotes the cardinality or number of elements in the set, and N the number of EAP devices in the stack (series connection).

The basis for the switching algorithm is an optimization problem that attempts to find a control vector (s) that minimizes the absolute error (e) between a reference signal (r*), such as the charge, voltage or electric field level originating from the harvesting strategy, and its estimated new value (r), which is estimated based on its actual value, the energy provided by the source and the switching vector, i.e.:

$$\min_{s \in S} \|r(s) - r^*\|$$

The proposed switching algorithm, however, is extended to a multi-objective optimization in order to incorporate also other aspects of the electromechanical power conversion, such as power quality and material breakdown strength. Also topological aspects and electrical limitations can be included by constraining the set of switching vectors to a set with only feasible control vectors, $S_f$. The resulting multi-objective constrained non-linear optimization problem could be described by:

$$\min_{s \in S_f} \sum_{i=1}^{k} w_i f_i(s)$$

$$\text{such that } \begin{cases} c(s) \leq 0 \\ c_{eq}(s) = 0 \end{cases}$$

which describes the optimization of a control vector s that minimizes the summed k objective functions in f, with each of the objectives being weighted by a scalarization parameter $w_i$, from a feasible switching vector set $S_f$ that is constrained by non-linear functions c and $c_{eq}$.

The full potential of the switching algorithm becomes evident in combination with the proposed topology and properly applied switching objectives and constraints. In an embodiment, the topology, control and device properties could be defined as:
- a constant-current source as Common Power Source with amplitude $I_{SRC}$,
- a voltage reference signal $U_{REF}$ for the EAP devices
- an EAP device with maximum field strength $E_{max}$ In this particular implementation, the optimization objectives of the switching algorithm could be defined as:
1. the field-weighted error between the estimated new EAP device voltage, which depends on the control vector, and the EAP device reference voltage:

$$f_1(s) = \left| \frac{E_{EAP}}{E_{max}} \left[ \left( u_{EAP} + s \frac{I_{src}}{f_s C_{EAP}} \right) - u_{EAP}^* \right] \right|$$

2. the output power ripple, being the difference between the instantaneous and long-term average output power.

If $\hat{P}_{out}$ denotes the estimated total output power, then the power ripple objective might be defined by:

$$f_2(s) = |(s \cdot \hat{u}_{EAP}) I_{src} - \hat{P}_{out}|$$
$$= \left|\left(s \cdot \left[u_{EAP} + s\frac{I_{src}}{f_s C_{EAP}}\right]\right) I_{src} - \hat{P}_{out}\right|$$

3. the switching losses, quantified by the number of switches that change from the previous switching state ($s_{n-1}$) to the new switching state:

$$f_3(s) = \Sigma |s - s_{n-1}|$$

The weighting factors $W_1 \ldots w_3$ of the linear scalarization can be selected randomly, depending on the application requirements. In another embodiment, one could also choose to normalize the objectives in order to be independent of the actual operating point. Similarly, by including exponential factors, the impact of the objectives can be made dependant on the error level.

In an embodiment, the field-weighted reference error objective $f_1(s)$ relies on the insight that the EAP devices can be effectively used as energy or charge storage devices and that the energy conversion operation is not significantly affected as long as the field strength of the variable capacitor associated to the storage mode is low compared to the operational or maximum field strength. Hence, more control freedom is obtained by allowing a higher error at low field strengths, while following the reference signal stricter at high field strengths.

The constraints that are applied to the optimization are considered essential for feasible operation of the proposed topology. Since all EAP devices can potentially be connected in series ($s_1 \ldots s_N = 1$ or $-1$), both the topology and its components and the Common Power Source PSS1 can be exposed to relatively extremely high voltages. To limit the voltage stress on the components to reasonable values, thereby also increasing the commercial feasibility of the system, and to protect the EAP devices from field strengths exceeding the dielectric breakdown strength, the following constraints are proposed:

1. the field strength of any EAP device should never exceed a predefined maximum, where it is advised that the maximum is slightly above the operational field strength to provide some control freedom:

$$c_1(s) = |E_{EAP}| - E_{max} = \frac{1}{d_{EAP}}\left|u_{EAP} + s\frac{I_{src}}{f_s C_{EAP}}\right| - E_{max}$$

2. the voltage across the Common Power Source PSS1, being the estimated new total voltage of the stack, should be limited to an upper and lower value, where it is identified that a wider range leads to faster dynamic response, whereas a smaller range leads to smoother voltage and power curves:

$$c_2(s) = (s \cdot \hat{u}_{EAP}) - U_{src(high)}$$
$$= \left(s \cdot \left[u_{EAP} + s\frac{I_{src}}{f_s C_{EAP}}\right]\right) - U_{src(high)}$$
$$c_3(s) = U_{src(low)} - (s \cdot \hat{u}_{EAP}) = U_{src(low)} - \left(s \cdot \left[u_{EAP} + s\frac{I_{src}}{f_s C_{EAP}}\right]\right)$$

3. the voltage of each node of the topology, $U_{n(i)}$, with respect to a predefined reference node (e.g. node 0 in FIG. 2) should be bounded to a maximum. If $L_1$ denotes a lower diagonal matrix with all its lower-diagonal elements being equal to one, and $\circ$ denotes a Hadamard entry-wise product:

$$c_4(s) = L_1(s \circ \hat{u}_{EAP}) - U_{n(max)}$$
$$= L_1\left(s \circ \left[u_{EAP} + s\frac{I_{src}}{f_s C_{EAP}}\right]\right) - U_{src(high)}$$

With respect to the proposed switching algorithm realization:

It is identified that the set of constraints might be different for non-steady state conditions or mechanical excitation sources with a very irregular nature.

It is identified that the optimization problem can be solved using a conventional (multi-objective) constrained optimization algorithm or simply using a brute-force search, depending on the number of sections in the multiphase EAP device system.

It is identified that irrespective of the chosen voltage limits on the Common Power Source voltage, the power source/sink unit PSS1 should always be able to supply power for the initial charging of the EAP devices.

It is assumed that the current that is supplied by the PSS1 is fixed at a constant DC level. Alternatively, the multi-phase system may also operate with AC currents. It is considered that a DC current with a superimposed AC current harmonic can be beneficial for certain types of (non-forced commutated) switches in the electronic charge/discharge unit, e.g. thyristors.

It is also considered that the AC current harmonic can be used for auxiliary power supply of the electronics.

It is further identified that the (average) current of the common current source ($I_{SRC}$) can be dynamically changed in response to different mechanical power input levels; e.g. a low average current for small strain cycles (lower losses), and a high average current for large strain cycles. The switching algorithm might change the control signal ($I_{SRC(ref)}$) when, for instance, the duty ratio or pulse width applied to the EAP sections is too small leading to excessive losses.

It is assumed that the switching period is infinitely small or in practice much smaller than the energy harvesting cycle frequency or the mechanical excitation frequency carried out by the EAP device, hence, the voltage and field strength of the EAP device substantially do not change during a switching period. If this is not valid, the constraints can be extended to include a set for the beginning and for the end of the switching period.

It is assumed that the series resistance of the EAP device is relatively small, i.e. the inherent storage capability exploited by the switching algorithm does not lead to significant additional resistive losses. Otherwise, another optimization objective could be included that minimizes these Joule losses.

FIG. 9*a*-9*d* show the results from the Harvesting Strategy generated by blocks F3-F4 of the controller CT, valid for single-phase systems but more beneficial for multi-phase systems.

Figure 10:
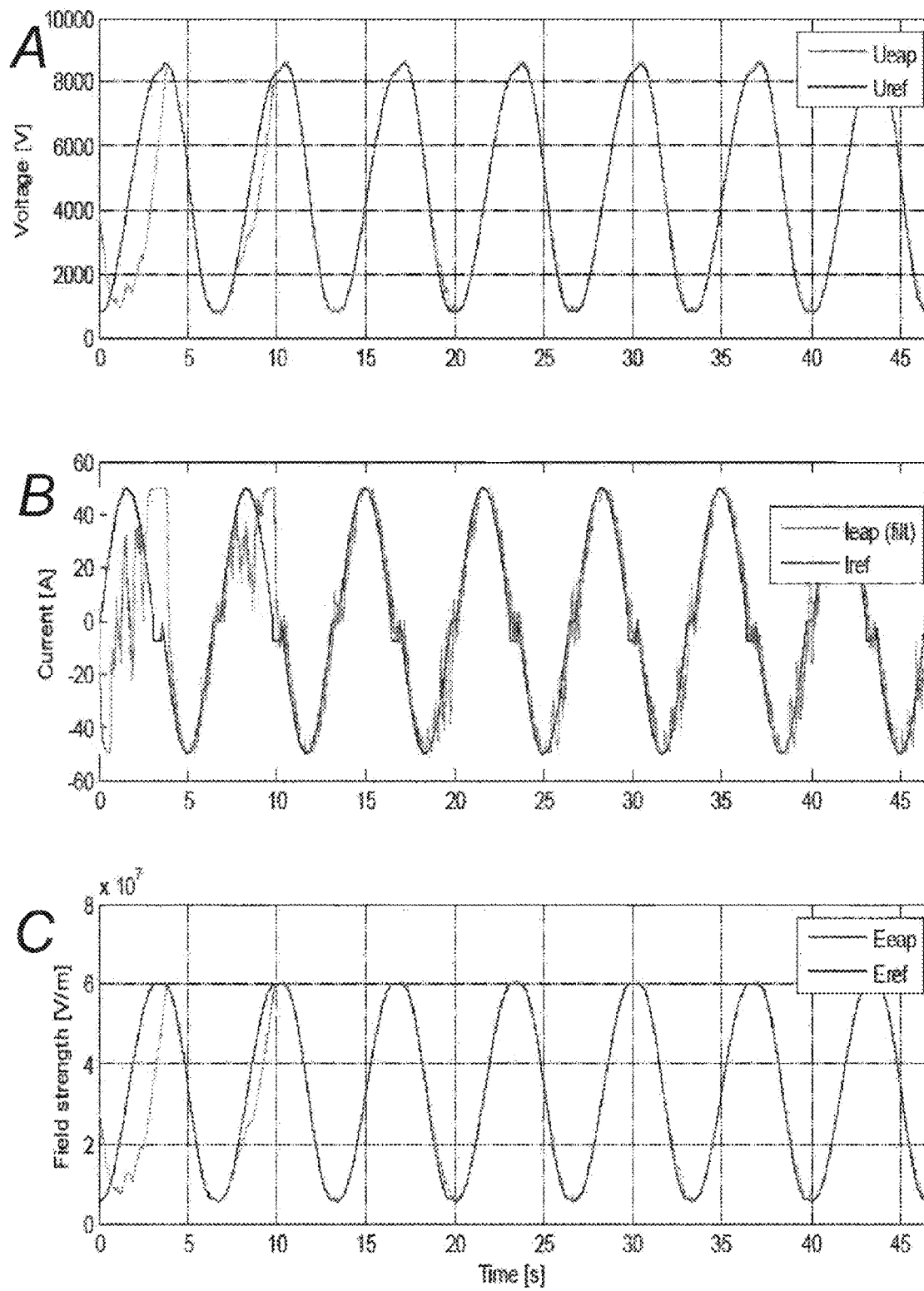
FIGS. 10a-10c shows examples of a voltage signal, a current signal and a field strength signal, respectively in a multiphase topology of 10 EAP devices.

FIG. 10*a*-10*c* shows the result of the switching algorithm, with the voltage and current reference signals (as resulting from the Harvesting Strategy and generated by CT) and the actually achieved and measured EAP device signals.

In FIG. 9a-9d, the EAP device is biased (charged) and unbiased (discharged) by a sinusoidal current waveform with current amplitudes Ic and Id, with a phase of φc and φd respectively. During contraction a constant-field approach is followed, whereas during stretching a constant-charge profile is enforced. Compared to single-phase systems, the lower electric field level during this phase is elevated in the multi-phase EAP system to increase the number of available switching states.

Figure 8:
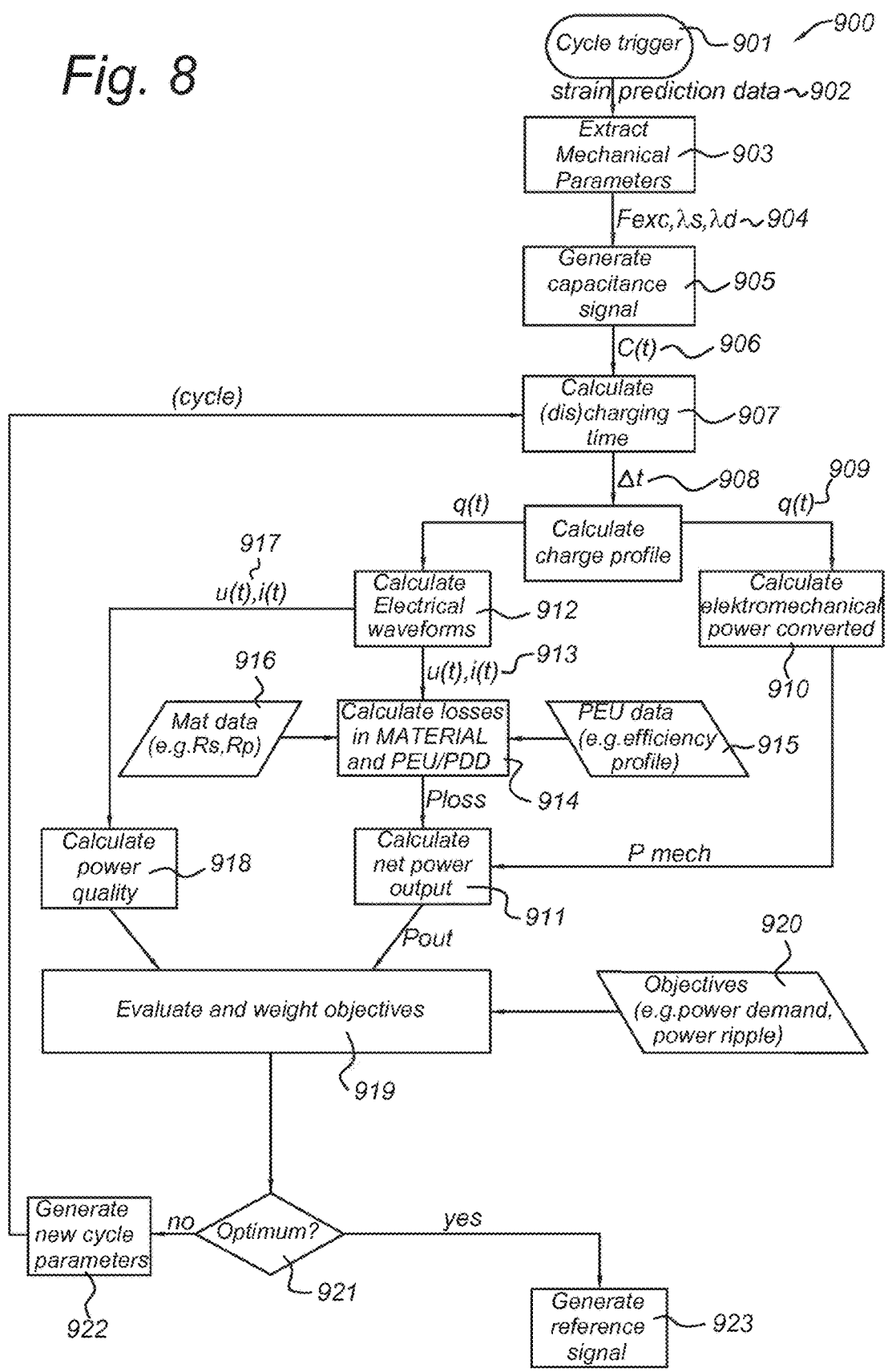
FIG. 8 shows a flow diagram of a method for energy harvesting for use with the multiphase topology.
Figure 9:
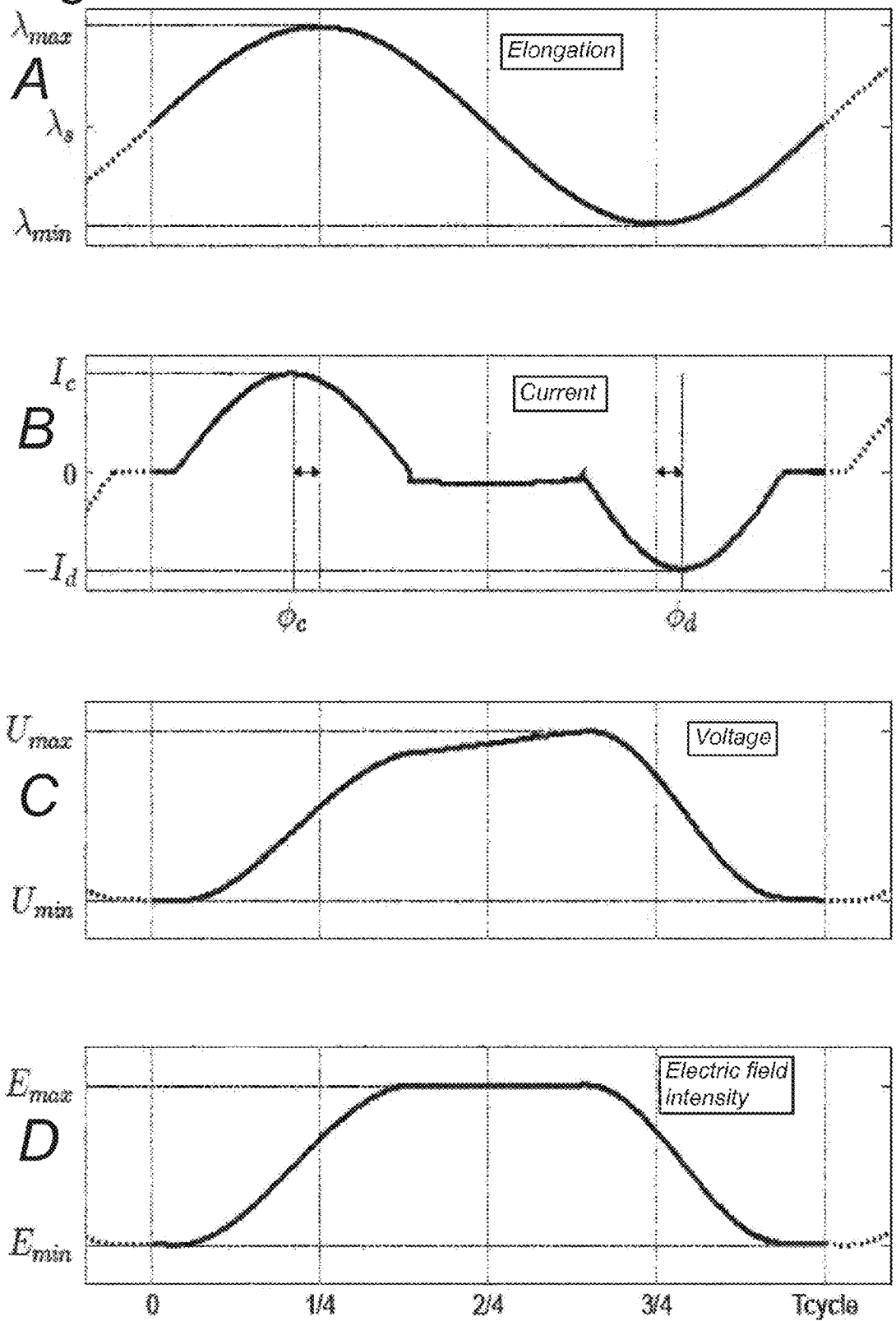
FIG. 9a-9d show results of an example harvesting strategy method for use in a multiphase topology using a common power source in accordance with embodiment of FIG. 2.

FIG. 8 shows a flow diagram of an example method for control of energy harvesting by a multiphase EAP system according to the invention.

The method can be implemented by a computer program product that allows the processing unit of the controller CT after being loaded with computer program product instructions to perform calculations in accordance with the method.

The method runs independently for each EAP device in the multi-phase system on the processing unit of the controller CT, and could be executed sequentially or concurrently (in parallel). Timing or phase synchronization for each EAP device is obtained by the cycle trigger.

The method after initializing steps (not shown) comprises a first step 901 in which the start of a new cycle is detected in the predicted strain signal (starting after block F1 of the controller scheme from FIG. 7). The predicted strain signal 902 is forwarded to a next step 903 that extracts and estimates the key mechanical parameters 904 from the predicted strain for the specific EAP device. The extracted parameters 904 relate to the mechanical excitation frequency Fexc, the static deformation λs, the deformation amplitude λd and the strain profile in time.

The parameter values are used in a subsequent step 905 to generate an equivalent capacitance signal C(t) 906 that is used in subsequent steps to calculate the electrical quantities.

In a next step 907 the capacitance signal C(t) 906 is used as input, together with the (initial) cycle parameters {cycle}, to calculate the charging time Δt(c), the discharging time Δt(d), and the remaining stretching Δt(s) and contraction time Δt(r). With the essential timing information Δt for each phase of the cycle, the charge profile of the specific EAP device q(t) is calculated in a subsequent step 908.

The cycle parameters {cycle} are defined as
charging phase (φc);
discharging phase (φd);
charging current amplitude (Ic);
discharging current amplitude (Id);
charging current waveform {rectangular, triangular, sinusoidal, constant-power};
discharging current waveform {rectangular, triangular, sinusoidal, constant-power};
minimum field strength during contraction (Emin);
maximum field strength during stretching (Emax);
cycle type {constant-charge, -voltage, -field}.

In a next step 910, the charge profile q(t) 909 is used as input together with the capacitance signal C(t) 906 to calculate an estimate for the electromechanical power Pmech to be converted. In a parallel step 912 with step 910, the charge profile q(t) is used as input for calculation of electrical waveforms 913 in terms of voltage u(t) and current i(t) to be imposed on the specific EAP device.

The waveforms u(t), i(t) are used in step 914 as inputs to calculate losses Ploss in both the EAP material and the electronic charge/discharge unit of each EAP device. Key parameters relating to characteristics of the electronic charge/discharge units and the EAP material, as a function of the calculated voltage profile u(t) and current profile i(t), are retrieved from memory 915 and 916. Memory 915 and 916 may each be arranged as a database or lookup-table. The calculated losses Ploss are subsequently entered in step 911, in combination with the calculated electromechanical power Pmech. In step 911, the net power output Pout is calculated from the difference between Pmech and Ploss.

The electrical waveforms u(t) i(t) are also used as input, together with the electrical waveform vectors u(t), i(t) with the electrical waveforms of the other sections in the system, for step 918 which calculates a quality parameter for the overall multi-phase system output power.

The result from step 918 and step 911 are next used as input for step 919 in which an evaluation is made based on the quality parameter from step 918, the net output power Pout and external data from module 920. Such external data comprise parameters such as the desired system output power (power demand), ripple in the system output, force applied by the electric field pressure on the EAP device and its mechanical source, and the amount of stored energy in the total system which could act as a power reserve to support grid stability during faults.

The evaluation step determines an evaluation result data which is indicative whether the charge profile q(t) 909 (or any derived electrical quantity) as determined in step 908 fulfills conditions imposed by the external data.

Next in step 921, the evaluation result data is tested to determine if the charge profile q(t) 909 (or any derived electrical quantity) fulfills an optimum criterion with respect to the externally defined objective data or not.

In case the optimum criterion is not fulfilled, the method continues in step 922 to generate new cycle parameters and then returns to step 907. In the alternative case that the optimum criterion is fulfilled, the method continues at step 923 to generate a reference signal i.e. a voltage reference signal $u_{ref}$ in accordance with FIG. 7-block F4. The voltage reference vector for all EAP devices $u_{ref}$ is, for series-connected multi-phase systems, converted into a control signal vector S by the Switching Algorithm (FIG. 7—block F5) to adjust the electronic charge/discharge units for each EAP device. The Switching Algorithm could also adjust the reference signal of the source current $I_{SRC}$ in accordance with the optimized charging and discharging current amplitude.

After step 923 the method returns to step 901 for a next cycle trigger.

Note: depending on the predictability of the strain signal, the cycle optimization could be split in two parts for the charging and discharging phase, in which effectively the cycle trigger is given twice per full mechanical cycle. This increases the accuracy and hence, the ability to accurately match the objectives.

FIGS. 10a-10c shows examples of a multiphase topology of 10 EAP devices of a voltage signal, a current signal and a field strength signal, respectively.

Figure 11:
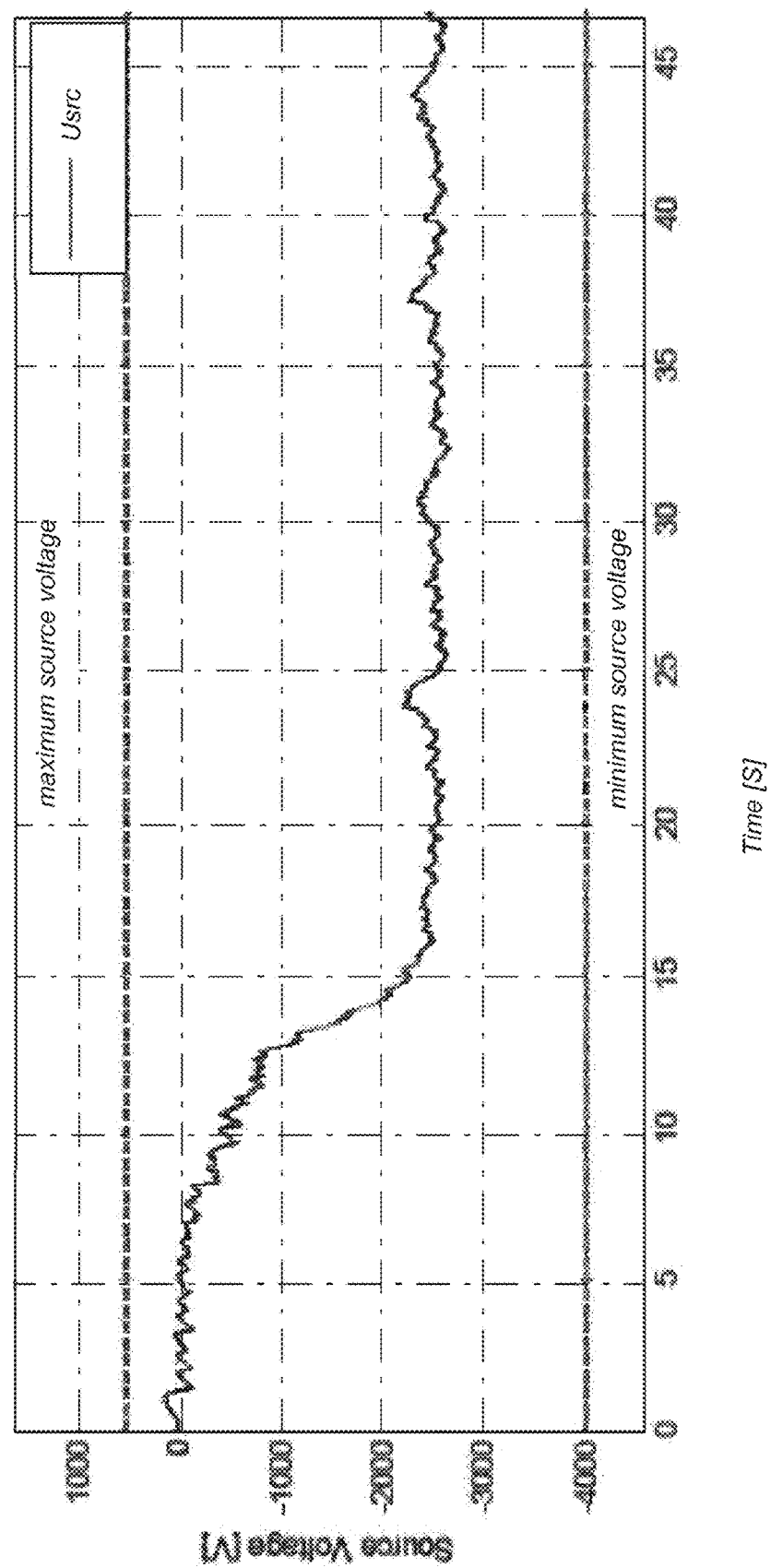
FIG. 11 shows an example of the voltage signal across the common power source, being actively controlled and bounded by the switching signal from the controller.

FIG. 11 shows an example of the averaged voltage signal across the common power source, being actively bounded by the switching signal from the controller.

The system and method according to the present invention provide advantages.

Different to existing single-phase EAP energy conversion systems, the proposed multi-phase system only requires the net output power to be actively processed, whereas the power associated to cyclically (un)biasing the EAP devices only needs routing. In practical prior art applications with limited strain, the ratio between the biasing power and the net output power is well above 30.

For the power electronic converter that is actively converting the power from the EAP device to an electrical grid, this means:

- A reduction of the converter power rating by a factor of 30, which reduces the volume and cost by approximately a factor 30 as well.
- A reduction of the converter efficiency constraints, since the converter is only processing the net output power. This reliefs the need for advanced converter technology, further reducing the cost.
- A reduction of the converter power density constraints, since the power rating is significantly reduced. This reliefs the need for high switching frequencies and hence, advanced converter technology, further reducing the cost and typically increasing the efficiency.

Additionally the present invention provides a reduction of total cable length by a large factor. The complexity of the power electronics required for each section in the multiphase system is reduced from an advanced high-frequency switching power converter to a low-frequency switching Power Director Device. The reduction in complexity results in a reduction in volume, which allows the PDD's to be placed close to the EAP devices. Referring to FIG. 1, this means that for long, distributed, multi-phase EAP energy conversion systems, the total cable length is drastically reduced: instead of 2 cable conductors for each section over the full length of the device, which could easily add up to 40 cable conductors per system, a total of only two cable conductors over the full length is required. Since one conductor is connected to the zero-node (i.e. ground), any kind of ground shield or sheathing of the EAP harvesting system itself might be used for this connection, reducing the required cable conductors to only 1 over the full length.

Further the present invention allows use of Industry-standard, high efficiency switching components. The frequency at which the Power Director Devices typically operate (100-200 Hz) is very low and in the same range of existing industrial power systems such as High-Voltage Direct Current converters (e.g. Siemens' Modular Multilevel Converter). The advantage is that industry-standard, easy series-configurable switch technology can be used.

When an AC current is superimposed to force Zero Current Switching, high-voltage and high-current thyristors might be used. These devices offer very low losses and are available as Direct Light Triggered devices, eliminating the need for further galvanic isolation of the control signals and to some extent, auxiliary power supply.

Additionally, the present invention provides a reduction of power fluctuations. With the energy harvesting strategy using the multi-phase variable capacitor sections effectively as energy storage devices, the output power fluctuation is actively reduced. A constant power output implies that less energy storage is required on the exporting bus to filter out high voltage or high current peaks. Since the converter is only processing the net output power, it is operating at a rather constant power level. This is further supported by the power smoothing provided by the employed harvesting strategy. The constant power level makes the converter less subject to thermal cycling, increasing its reliability and life time.

Compared to single-phase PEU, the power fluctuation is now mostly at the switching frequency (millisecond range) than at the mechanical excitation frequency range (seconds), which reduces the depth and impact of the thermal cycles.

The present invention also provides an actively supporting grid stability. Combining the energy conversion capability simultaneously with the ability to store energy within the multi-phase system sections, the invention provides an effective method to control the instantaneous power output, to a potentially much further extent than (a)synchronous rotational power generators. This property can be used extensively to support the electrical grid during faults, but also to provide the exact amount of power to balance power generation with power demand.

Also, a reduction of EMI emission can be achieved. For realizations incorporating a constant current source, the emission of electromagnetic radiation is substantially reduced: the DC current in the cable does not radiate a time-varying magnetic field and the electric field is effectively shielded by the cable sheaths.

The invention has been described with reference to the preferred embodiments. Obvious modifications and alterations will occur to the skilled in the art upon reading and understanding the preceding detailed description. It is intended that the invention be construed as including all such modifications and alterations insofar as they come within the scope of the appended claims.

The invention claimed is:

1. An energy harvesting system, comprising:
   a plurality of Electro Active Polymers (EAP)-based sections, each EAP-based section comprising:
      an electronic charge/discharge unit, and
      a variable capacitor comprising an elastically-deformable body with an arrangement of stretchable synthetic material and electrodes being configured as the variable capacitor with a capacitance that varies as the deformable body stretches and relaxes,
   a power source/sink unit; and
   a controller comprising
      a processing unit,
      sensing circuitry, and
      driving circuitry,
      the processing unit being coupled to the sensing circuitry and the driving circuitry,
   wherein each EAP-based section is connected to the power source/sink unit by the respective electronic charge/discharge unit under control of the controller,
   the sensing circuitry is coupled to the variable capacitor of each EAP-based section to receive at least one state parameter signal from the variable capacitor,
   the driving circuitry is coupled to the electronic charge/discharge unit to transmit a dedicated control signal to the electronic charge/discharge unit, and
   the processing unit is configured to establish, for each EAP-based section, a control value of the dedicated control signal based on the associated state parameter signal received from the variable capacitor,
   the plurality of EAP-based sections is in a series connection to the power source/sink unit,
   the electronic charge/discharge unit of the EAP-based section is provided with a tri-state switch that is controlled by the dedicated control signal and is configured in a first switching state to connect the variable capacitor to the power source/sink unit in a charging mode for a charging mode value of the dedicated control signal, in a second switching state to connect the variable capacitor to the power source/sink unit in a discharging mode for a discharging mode value of the dedicated control signal, and for a floating mode value of the dedicated control signal in a third switching state, to bypass the variable capacitor in a floating mode, leaving the variable capacitor isolated.

2. The system according to claim 1, wherein the controller is configured to feed a source current that is generated by the power source/sink unit based on an aggregate of the switching states imposed on the tri-state switches by the driving circuitry.

3. The system according to claim 2, wherein the at least one state parameter signal of the EAP-based section is proportional to the voltage signal Ueap_i on the respective variable capacitor, and the source voltage Ueap_src is proportional to a weighted sum of the voltage level of each variable capacitor multiplied by a control value based variable for the respective variable capacitor,
the control value based variable having either positive unitary value for the charging mode, or negative unitary value for the discharging mode or a zero value for the bypassing mode.

4. The system according to claim 1, wherein the plurality of EAP-based sections is in a parallel connection to the power source/sink unit.

5. The system according to claim 1, wherein the electronic charge/discharge unit comprises a converter unit, and a monitoring unit,
the converter unit is connected to the power source/sink unit at first terminals and at second terminals with terminals of the variable capacitor,
the monitoring unit is connected with the terminals of the variable capacitor to monitor the at least one state parameter signal of the variable capacitor,
the sensing circuitry is connected to the monitoring units to receive the at least one state parameter signal from each EAP based section,
the driving circuitry is connected to the converter units to transmit the dedicated control signal to the respective converter unit.

6. The system according to claim 5, wherein the converter unit of the EAP-based section is configured to be under control of the dedicated driving signal to perform one action selected from actions:
connecting the variable capacitor to the power source/sink unit in a charging mode,
connecting the variable capacitor to the power source/sink unit in a discharging mode, and
isolating the variable capacitor in a floating mode, leaving the variable capacitor isolated.

7. The system according to claim 6, wherein, during the discharging mode, the converter unit couples the variable capacitor to the power source/sink unit to discharge the variable capacitor.

8. The system according to claim 1, wherein the controller is configured to sample the at least one state parameter signal from the monitoring units by the sensing circuitry at a sampling time interval that is shorter than an average time span for said variation of the capacitance of the variable capacitor in each EAP-based section.

9. The system according to claim 8, wherein the controller is configured to transmit control signals or control vector S by the driving circuitry.

10. The system according to claim 1, wherein the controller comprises
a strain predictor unit,
a strain estimator unit,
a cycle optimizer unit,
a reference generator, and
a mode selection or switching algorithm unit, wherein the processing unit is configured to determine control signals based on the at least one received state parameter signal, the processing unit being configured to subsequently perform on the at least one state parameter signal the functions of strain prediction, strain estimation, cycle optimization and the generation of a reference signal to obtain a reference voltage signal Uref, the processing unit further being configured to perform the mode selection function of switching algorithm to determine the control signal for each individual EAP section using as inputs the reference voltage signal and the at least one received state parameter signal to optimize the overall energy harvesting.

11. A method for an energy harvesting system including a plurality of Electro Active Polymers (EAP)-based sections, a power source/sink unit, and a controller, each EAP-based section including an electronic charge/discharge unit and a variable capacitor an elastically deformable body with an arrangement of stretchable synthetic material and electrodes being configured as the variable capacitor with a capacitance that varies as the deformable body stretches and relaxes, each EAP-based section being connected to the power source/sink unit by the respective electronic charge/discharge unit under control of the controller that includes a processing unit, sensing circuitry, and driving circuitry, the processing unit being coupled to the sensing circuitry and the driving circuitry, the sensing circuitry being coupled to the variable capacitor of each EAP-based section, the driving circuitry being coupled to the electronic charge/discharge unit, the method comprising:
for each EAP-based section:
receiving at least one state parameter signal from the variable capacitor establishing a dedicated control signal based on the associated at least one state parameter signal received from the variable capacitor;
transmitting the dedicated control signal to the associated electronic charge/discharge unit; and
based on the dedicated control signal,
(1) connecting the variable capacitor to the power source/sink unit in a charging mode when the control signal represents a charging mode,
(2) connecting the variable capacitor to the power source/sink unit in a discharging mode when the control signal represents a discharging mode, or
(3) bypassing the variable capacitor in floating mode when the control signal represents a floating mode, leaving the variable capacitor isolated.

12. The method according to claim 11, further comprising:
determining a source voltage for the power source/sink unit based on an aggregate of the mode imposed on each EAP-based section by the respective control signal.

13. The method according to claim 11, wherein the at least one state parameter signal of the EAP-based section is proportional to a voltage signal Ueap_i on the respective variable capacitor, and a source voltage Ucps is proportional to a weighted sum of the voltage signal Ueap_i multiplied by a control signal based variable for each variable capacitor,
the control signal based variable having either positive unitary value for the charging mode, or negative unitary value for the discharging mode or a zero value for the bypassing mode.

14. The method according to claim 11, wherein establishing control signals is based on the at least one received state parameter signal and includes, for each EAP section, subsequently performing on the at least one state parameter signal:
- a strain prediction,
- a strain estimation on the predicted strain, and
- a cycle optimization on the estimated strain,
- generating a reference signal based on the cycle optimization as a reference voltage signal Uref;
- performing a mode selection function of switching algorithm F5 the control signal S for each individual EAP section, using as inputs the reference voltage signal and the received at least one state parameter signal such that the overall energy harvesting system is optimized.

* * * * *